United States Patent [19]

Aoyama

[11] Patent Number: 5,208,521
[45] Date of Patent: May 4, 1993

[54] CONTROL SYSTEM FOR A SELF-MOVING VEHICLE

[75] Inventor: Hazime Aoyama, Utsunomiya, Japan

[73] Assignee: Fuji Jukogyo Kabushiki Kaisha, Tokyo, Japan

[21] Appl. No.: 940,326

[22] Filed: Sep. 3, 1992

[30] Foreign Application Priority Data

Sep. 7, 1991 [JP] Japan .................................. 3-227542

[51] Int. Cl.$^5$ .............................................. A47L 9/28
[52] U.S. Cl. .................................... 318/587; 318/586; 318/139; 15/319; 180/169; 901/1
[58] Field of Search ........................... 318/568.10–572, 318/585–587, 139; 180/167–169; 901/1; 395/80–98; 33/356; 364/454, 458, 424.01, 424.02, 426; 15/319, 340.1

[56] References Cited

U.S. PATENT DOCUMENTS

| | | |
|---|---|---|
| 4,213,116 | 7/1980 | Holtzman et al. |
| 4,344,498 | 8/1982 | Lindfors ............................. 318/587 |
| 4,414,548 | 11/1983 | Carpenter et al. |
| 4,505,206 | 3/1985 | Gottzein et al. ..................... 318/587 |
| 4,556,940 | 12/1985 | Katoo et al. ..................... 318/587 X |
| 4,700,427 | 10/1987 | Knepper ............................. 318/587 |
| 4,924,153 | 5/1990 | Toru et al. ......................... 318/587 |
| 4,993,274 | 2/1991 | Downton ............................. 74/5.46 |
| 5,032,775 | 7/1991 | Mizuno et al. ................. 318/580 X |
| 5,109,566 | 5/1992 | Kobayashi et al. ................. 15/319 |

Primary Examiner—Paul Ip
Attorney, Agent, or Firm—Beveridge, DeGrandi, Weilacher & Young

[57] ABSTRACT

A control system for a self-moving vehicle is provided with a pair of driving wheels on both sides of a shaft of a vehicle, motors for driving the driving wheels, velocity encoders for outputting velocity feedback signals in detecting the rotational velocities of the driving wheels being connected to the driving wheels, a main control apparatus for outputting velocity instruction signals instructing the rotational velocities of motors being given a direction instruction signals, a gyro for detecting a yaw rate of the vehicle, and a motor control apparatus for executing the controls of motors in integrating the velocity instruction signals and the velocity feedback signals with integrators for each period of time, and correcting the integrated velocity instruction signals with the integrated velocity feedback signals. The main control apparatus outputs the velocity instruction signal corrected with the integrated value of the yaw rate in the case where the integrated value of the yaw rate detected by the gyro for each fixed period of time is larger than a specified value or the value of the yaw rate is larger than another specified value so as to obtain an optimum directional and speed control of said self-moving vehicle without receiving an error from said gyro.

2 Claims, 5 Drawing Sheets

CONTROL SYSTEM FOR A SELF-MOVING VEHICLE

BACKGROUND OF THE INVENTION

1. Field of the Invention

The present invention relates to a system for controlling traveling movements of a self-moving vehicle.

2. Description of the Related Art

A self-moving vehicle, in general, has a driving wheel on each lateral side. Each driving wheel is driven in rotation by a respective motor. The travel control of such a self-moving vehicle is accomplished by controlling the rotation of the motors to maintain a constant travel direction or course of the vehicle.

Some of the conventional travel control systems for self-moving vehicles are disclosed in Japanese Patent Appln. Laid-Open No. 63-241611 and Japanese Patent Appln. Laid-Open No. 64-10613. In these systems, the traveling direction of the vehicle is detected with a gyro. Corrections of the direction are performed by steering to maintain an instructed direction by comparing the actual traveling direction with the instructed direction.

An error can be produced in an output signal from the gyro by an integration error, or a voltage drift in a circuit, when the gyro is used as a direction sensor. The error has a tendency to increase with elapse of time, being influenced by integration. Therefore, there has been a problem that it becomes impossible to detect accurately the actual traveling direction of the vehicle. Consequently, the actual traveling direction may deviate from the instructed direction.

An apparatus for controlling the travel of the vehicle without using the gyro is disclosed in Japanese Patent Appln. Laid-Open No. 3-6606. In the apparatus, the actual rotational displacements are compared with the rotational displacements to be made by the driving wheels on both sides for a predetermined period of time. Then the traveling direction is controlled by controlling the motors on both sides which are provided for respective driving wheels based on the deviation between the two wheels.

It is found that the feedback control of a motor system based on the rotational displacement of a motor is not able to cope with the trouble, when a rotational displacement is large, as in a case of a slip between a tire and a road surface.

As described above, there have been problems in a conventional travel control system for a vehicle. That is, when the gyro is used, the traveling direction of the vehicle gradually deviates. When the feedback control of the motor system is used, the feedback control becomes unable to cope with trouble such as tire slippage.

SUMMARY OF THE INVENTION

Accordingly, an object of the present invention is to provide a travel control system for a self-moving vehicle to maintain an instructed traveling direction.

To achieve the object mentioned above, the present invention provides the control system for the self-moving vehicle having, a pair of drive shafts coaxially provided under each left and right side of the self-moving vehicle, a pair of driving wheels supported on the driving shafts, each motor connected to the driving shafts, and a gyroscope mounted on a self-moving vehicle for detecting a direction to move and for generating a gyro signal, an improvement of the control system which comprises, an encoder connected to each driving wheel for detecting each speed of the wheels and for producing a speed signal, an A/D converter responsive to the gyro signal for converting an analogue signal into a digital signal and for generating the digital signal, a gyro integrator responsive to the digital signal for integrating the digital signal and for generating a feedback signal, a main controller responsive to the integrated signal for calculating the rotational speed of the motor and for generating a command signal, a speed integrator responsive to the command signal for integrating the command signal and for generating an integrated signal, a motor controller responsive to the speed signal and the command signal for integrating the both signals per a predetermined time and for correcting the command signal, and the main controller derives a correction signal of the command signal by integrating a yaw rate per the predetermined time when the yaw rate or an integrated yaw rate per the predetermined time is higher than a predetermined value so as to obtain an optimum directional and speed control of the self-moving vehicle without receiving an error from the gyro.

Only a feedback control of a motor based on a velocity signal and a velocity feedback signal is executed, when the value of the yaw rate detected by the gyro, or the travel eccentric angle of the vehicle, an integrated yaw rate per the predetermined time is smaller than the predetermined value. Then a correction of a direction is made without being affected by a voltage drift or an error in an integrated value which can be produced in the gyro.

In contrast with the correction mentioned above, the control system cannot cope with a trouble by only the feedback control of the motor as in the case of an occurrence of slippage of the driving wheel. Because the value of the yaw rate or the travel eccentric angle is larger than the predetermined value. Accordingly, a direction correction corresponding to the circumstances can be executed by giving a velocity instruction signal being corrected with the travel eccentric angle, an integrated yaw rate which can be detected without being affected by the influence of a slippage of a driving wheel, to the motor controller.

DESCRIPTION OF THE PREFERRED EMBODIMENTS

A preferred embodiment of the present invention will become understood from the following detailed description referring to the accompanying drawings.

Figure 1:
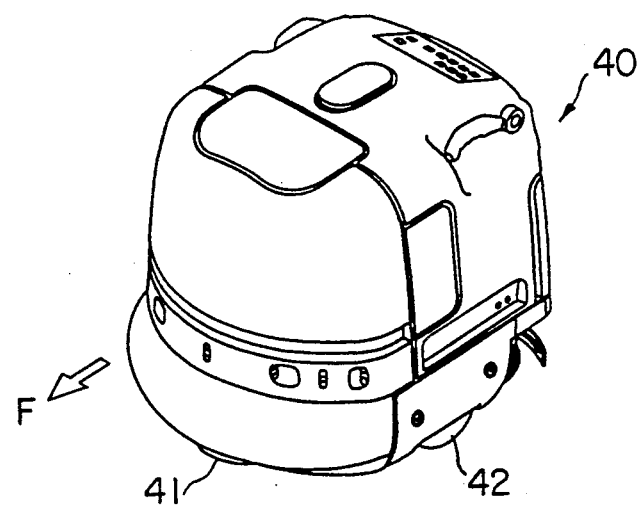
FIG. 1 is a perspective view showing an external view of a self-moving vehicle using a control system according to a first embodiment of the present invention.
Figure 2:
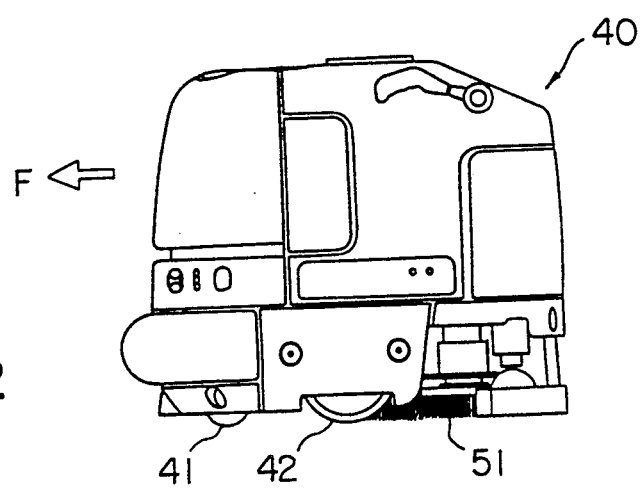
FIG. 2 is a right side view showing the left side of the self-moving vehicle.
Figure 3:
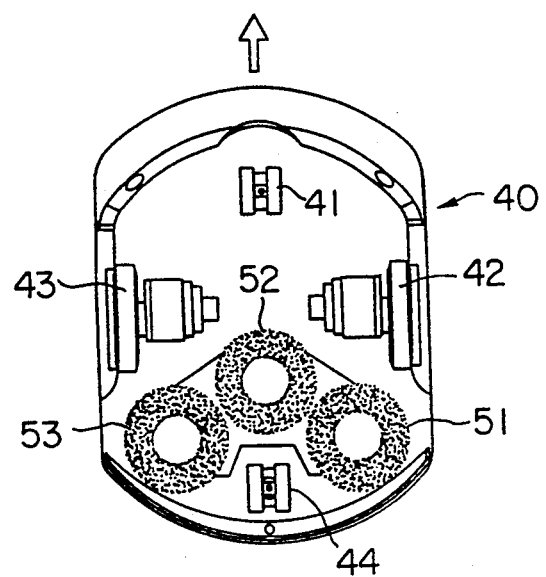
FIG. 3 is a bottom view showing the bottom of the self-moving vehicle.

Referring to FIGS. 1, 2, and 3, a self-moving vehicle travels in a direction indicated by arrow F. Wheels 41 and 44 are centrally provided in a front and a back of a body 40 of the vehicle. A pair of driving wheels 42 and 43 are disposed on opposite lateral sides at a middle position of the body 40. Three cleaning brushes 51, 52, and 53 are provided on the bottom of the body 40. The cleaning brushes 51, 52, and 53 are rotated for cleaning a surface such as a floor, when the vehicle travels.

Figure 4:
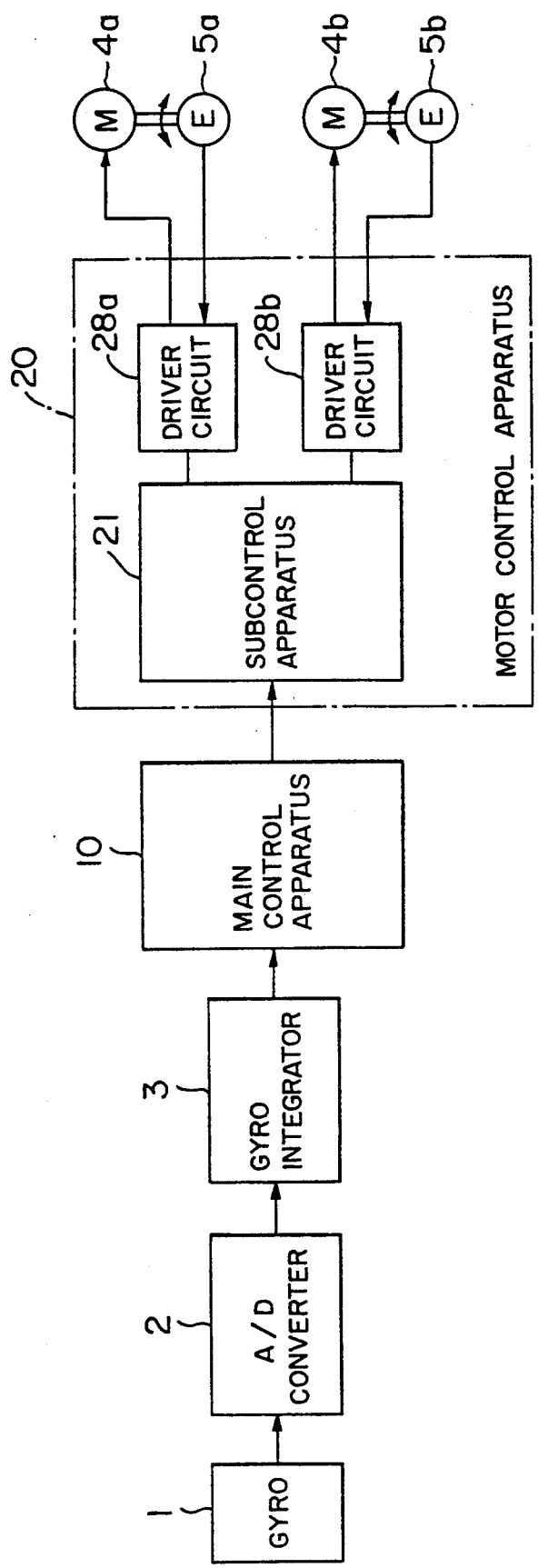
FIG. 4 is a schematic block diagram showing the control system for the self-moving vehicle.
Figure 5:
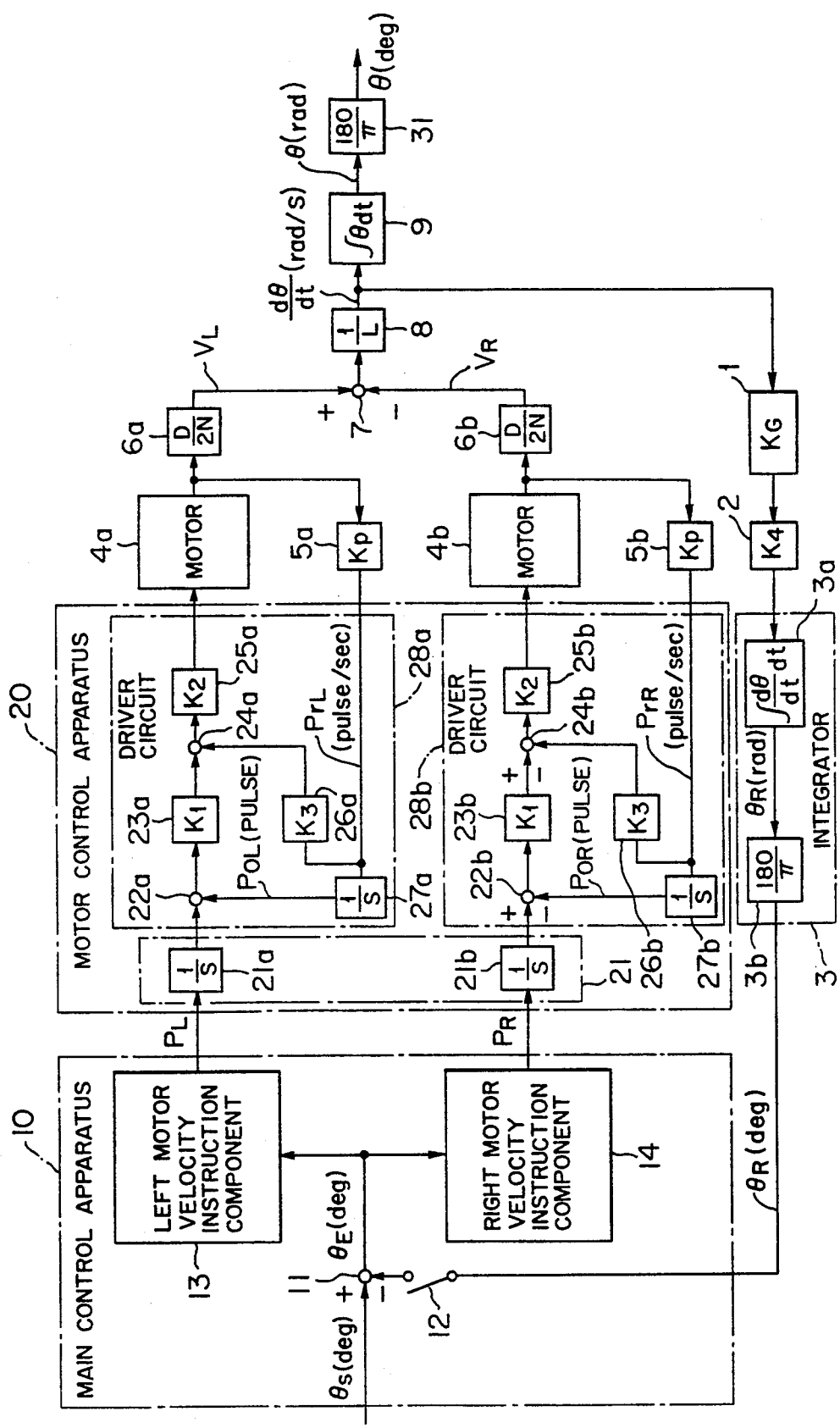
FIG. 5 is an explanatory diagram showing a control block of the control system for the self-moving vehicle.

FIG. 4 shows a block diagram of a control system for a self-moving vehicle according to the present invention. A motor 4a is connected to the left driving wheel 42. A motor 4b is connected to the right driving wheel 43. The output terminals of a motor control apparatus 20 are connected to the motors 4a and 4b respectively. A velocity encoder 5a is connected to the motor 4a. A velocity encoder 5b is connected to the motor 4b. The output terminals of the velocity encoders 5a and 5b are connected to input terminals of the motor control apparatus 20. An output terminal of the main control apparatus 10 is connected to another input terminal of the motor control apparatus 20.

The control system comprises not only a feedback control system based on the rotational displacement of a motor but also a feedback control system using a gyro 1. The gyro 1, an A/D converter 2 and a gyro integrator 3 are connected in series. An output terminal of the gyro integrator 3 is connected to an input terminal of the main control apparatus 10.

Figure 6:
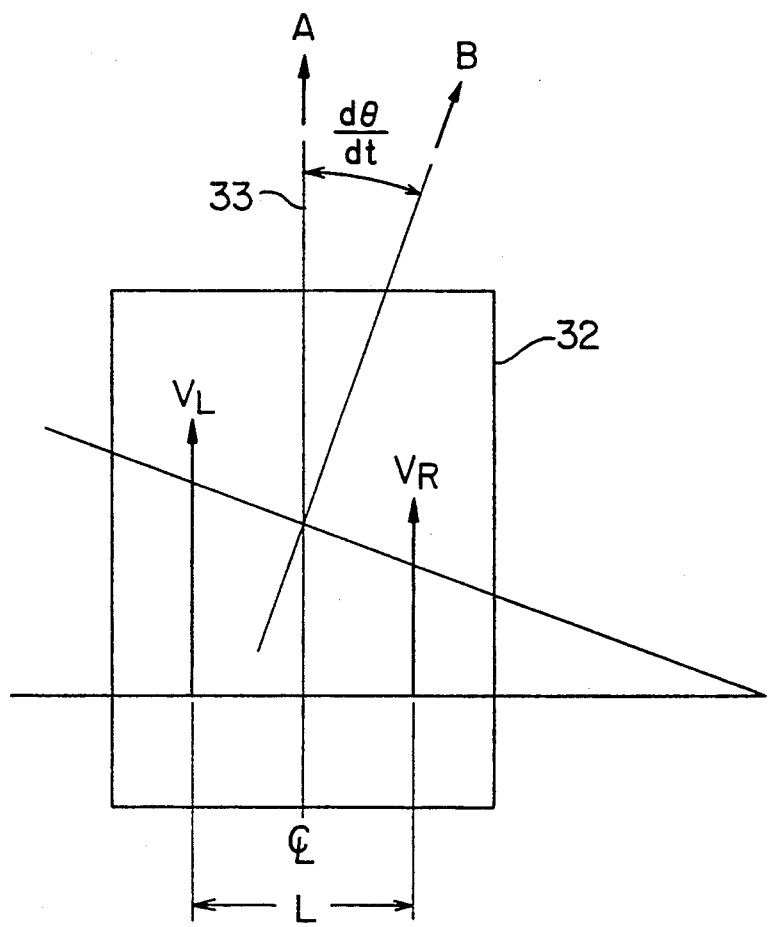
FIG. 6 is a vector diagram showing the relation between the velocity vectors of the two side wheels and the yaw rate of the self-moving vehicle.

As described above, the control system comprises a feedback control system of a motor and a feedback control system of a gyro. The systems are used appropriately depending on the magnitude of an eccentric angle $\theta$. The angle $\theta$ is the angle of deviation from the instructed direction. FIG. 6 shows a yaw rate $d\theta/dt$, which corresponds to the change rate, with the time of the travel eccentric angle $\theta$. The yaw rate has the relations with the velocity vectors of the wheels on both sides as shown in FIG. 6. A left driving wheel and a right driving wheel are disposed at a distance L on both sides of the vehicle 32. Each driving wheel rotates with a velocity and in a direction expressed by a vector $V_L$ or $V_R$. The vehicle 32 proceeds straight in the direction of arrow A, when the magnitudes of the velocity vectors $|V_L|$ and $|V_R|$ are equal to each other. The vehicle travels in an inclined direction indicated by arrow B, when the magnitude of the velocity vector $|V_L|$ of the left driving wheel is greater than the magnitude of the velocity vector $|V_R|$ of the right driving wheel. In this case, it is decided whether the gyro feedback control is to be accomplished or not depending upon the magnitude of an integrated yaw rate $d\theta/dt$ per the predetermined time.

Figure 7:
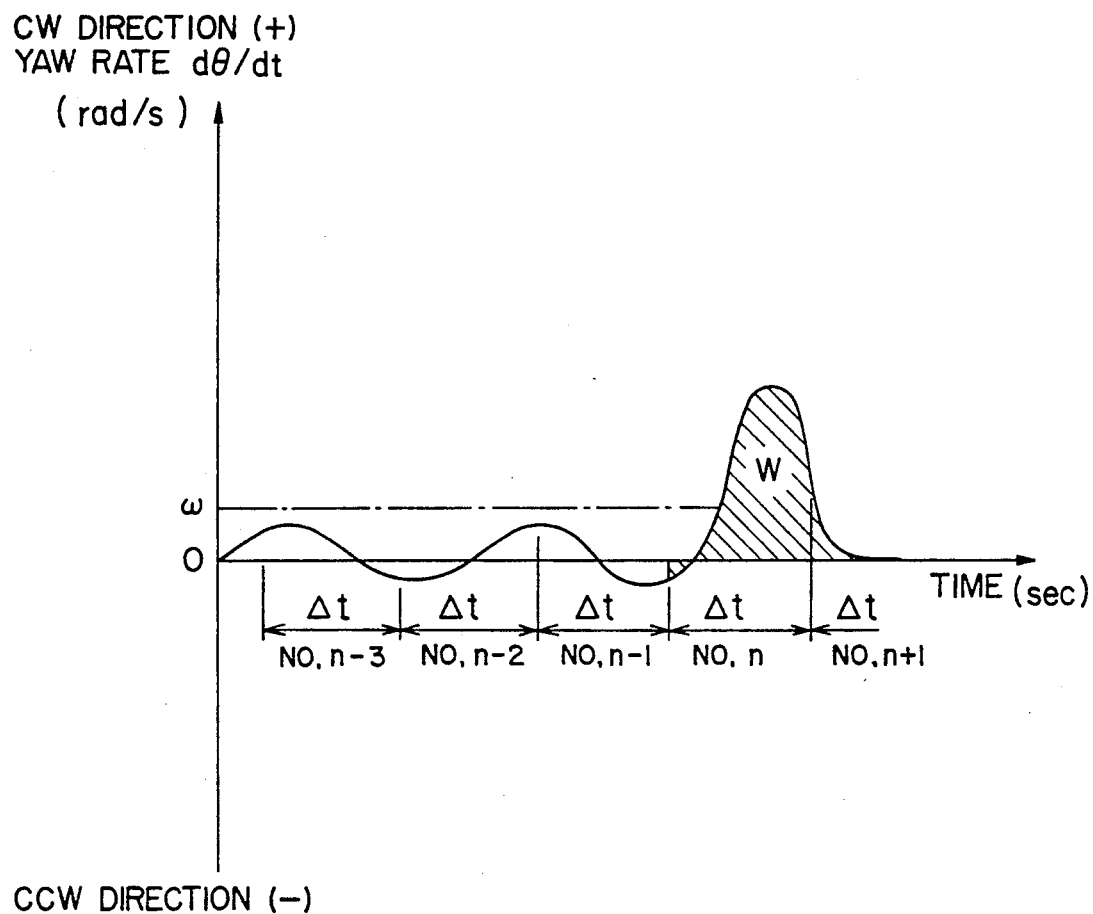
FIG. 7 is a time chart indicating the change of the yaw rate with the elapse of time in the control system.

FIG. 7 shows a manner in which the yaw rate $d\theta/dt$ varies with the elapse of time during the travel of the vehicle 32. The yaw rate $d\theta/dt$ is integrated per the predetermined time $\Delta t$. The control is executed only by the feedback control system of a motor, when the value of $\theta$ is less than a predetermined value W as in the cases of No. n-3, No. n-2 and No. n-1, or when the yaw rate is less than a predetermined value $\omega$. The correction of the direction is made by not only the feedback control of a motor but the feedback control of a gyro, when the integrated yaw rate $d\theta/dt$, an angle $\theta$, is greater than the predetermined value W or the yaw rate $d\theta/dt$ is greater than the value $\omega$.

Next, detailed control elements and the operation according to the present invention will be described with reference to the control block diagram shown in FIG. 4. The main control apparatus 10 is given a directional instruction value $\theta_S$ from the exterior and controls the motor control apparatus 20 on the basis of the directional instruction value $\theta_S$. The main control apparatus 10 comprises a comparator 11, a left motor velocity instruction component 13 and a right motor velocity instruction component 14. The direction instruction value $\theta_S$ is transmitted to the comparator 11 from the outside. A switch 12 is closed, when the gyro feedback control system is operated. A travel eccentric angle $\theta_R$ output from the gyro integrator 3 is input into the comparator 12 as described later. In the comparator 12, the travel eccentric angle $\theta_R$ is subtracted from the directional instruction value $\theta_S$, and a corrected directional instruction value $\theta_E$ is output. The switch 12 is opened, when only a motor feedback control is operated. The direction instruction value $\theta_S$ transmitted to the comparator 11 is output as a directional instruction value $\theta_E$.

The directional instruction value $\theta_E$ output from the comparator 11 is input into the left motor instruction component 13 and the right motor instruction component 14. The left motor instruction component 13 and the right motor instruction component 14 output velocity instruction signals $P_L$ and $P_R$ which instruct the rotational velocities of respective motor 4a, 4b on the basis of the directional instruction value $\theta_E$. The velocity instruction signals $P_L$ and $P_R$ are input into the motor control apparatus 20.

The motor control apparatus 20 comprises a sub-control apparatus 21 and driver circuits 28a and 28b. The sub-control apparatus 21 comprises integrators 21a and 21b corresponding to the driving wheels on both sides. The driver circuit 28a comprises a comparator 22a, a D/A converter 23a, a comparator 24a, a differential amplifier 25a, a velocity feedback circuit 26a, and an integrator 27a for the left driving wheel. The driver circuit 28b comprises a comparator 22b, a D/A converter 23b, a comparator 24b, a differential amplifier 25b, a velocity feedback circuit 26b, and an integrator 27b for the right driving wheel.

The velocity instruction signals $P_L$ and $P_R$ are respectively inputted into the integrators 21a and 21b of the sub-control apparatus 21. The integrators 21a and 21b integrate the signals $P_L$ and $P_R$ per a predetermined time and provide rotational displacement instruction signals. The rotational displacement instruction signals indicate the values of the rotational displacements as numbers of pulses through which the driving wheels on both sides should rotate per the predetermined time respectively. The rotational displacement instruction signals $P_L'$ and $P_R'$ are output to the comparators 22a and 22b in the driver circuits 28a and 28b. On the other hand, velocity encoders 5a and 5b count the numbers of pulses per a predetermined number of rotations, which are detected when the shafts of motors 4a and 4b rotate, using a constant $K_p$ (number of pulses/rad), and output velocity feedback signals $P_{rL}$ and $P_{rR}$. The feedback signals $P_{rL}$ and $P_{rR}$ are inputted into the integrators 27a and 27b. The integrators 27a and 27b integrate the feed back signals $P_{rL}$ and $P_{rR}$ per the predetermined time to obtain the displacements of actual rotations of the shafts of the motors 4a and 4b per the predetermined time and providing feedback rotational displacements signals $P_{OL}$ and $P_{OR}$. The feedback rotational displacements signals $P_{OL}$ and $P_{OR}$ are outputted to the comparators 22a and 22b. In the comparators 22a and 22b, there are obtained deviations between rotational displacement instruction signals from the integrators 21a and 21b and the feedback rotational displacements signals $P_{OL}$ and $P_{OR}$, and provided actual rotational displacement signals which show the displacements of actual rotations. The actual rotational displacement signals are output to the D/A converters 23a and 23b. The actual rotational displacement signals are converted to analog mode signals using a voltage conversion constant $K_1$ (V/number of pulses) in the D/A converters 23a and 23b. The analog mode signals are output to the comparators 24a and 24b. The velocity feedback signals $P_{rL}$ and $P_{rR}$ output from the velocity feedback circuits 26a and 26b are also transmitted to the comparators 24a and 24b. The velocity feedback circuits 26a and 26b convert the rotational velocities of motors 4a and 4b to voltage signals, using the velocity voltage conversion constant $K_3$ (V/number of pulses per unit time). These voltage signals are output to the comparators 24a and 24b.

There are obtained values which are composed of the actual rotational displacements expressed by the voltage signals and the deviation values between the rotational displacements to be made which are outputted from the D/A converters 23a and 23b and the actual rotational composite values are outputted to differential amplifiers 25a and 25b. The differential amplifiers 25a and 25b amplify the outputs from the comparators 24a and 24b at a predetermined gain $K_2$ (V/V) and transmit the outputs to the motors 4a and 4b, respectively. The motors 4a and 4b rotate on the basis of the output signals from the differential amplifiers 25a and 25b.

As described above, in the control system, only the motor feedback control is executed when the travel eccentric angle $\theta$ is less than a specific value W or when the yaw rate $d\theta/dt$ is less than a specific value $\omega$. In this case, not only are velocity controls executed by the velocity instruction signals $P_L$ and $P_R$ output from the main control apparatus 10, but feedback controls are also executed to apply corrections to the rotational displacements which are made per predetermined time. Therefore, correction of the direction can be effectively achieved even for an uneven surface which hinders the vehicle 32 to travel in an instructed direction.

It is possible to output the angle $\theta$ by providing operators 6a and 6b, a comparator 7, an operator 8, an integrator 9, and an operator 31, while those components are not directly necessary for the feedback control to output a travel eccentric angle $\theta$. The operators 6a and 6b detect the rotational velocities of the motors 4a and 4b respectively. There obtained the left-side velocity Vector $V_L$ and right-side velocity vector $V_R$ by using a velocity reduction ratio N (rad/s / rad/s) and the diameter D of the driving wheel. The velocity vectors $V_L$ and $V_R$ are input into the comparator 7, where the value of the difference $V_L - V_R$ is obtained. This difference is output into the operator 8. The operator 8 obtains the yaw rate $d\theta/dt$ (rad/s) by multiplying the value $V_L - V_R$ by 1/L, the reciprocal of the interval L between the driving wheels. The resulting output is transmitted to the integrator 9. The integrator 9 obtains the travel eccentric angle $\theta$ (rad) by integrating the yaw rate $d\theta/dt$ per the predetermined time. The operator 31 converts the unit of angle from the radian to the degree to obtain the travel eccentric angle $\theta$ (deg) and outputs the result.

Next, the operation is as follows. When the travel eccentric angle $\theta$ is greater than the value W or the yaw rate $d\theta/dt$ is greater than the value $\omega$, feedback control with the gyro 1 is executed. The gyro 1 receives the yaw rate $d\theta/dt$ output from the operator 8 and multiplies it by the gyro constant $K_G$ (rad/s / rad/s). The resulting output is transmitted to the A/D converter 2. The A/D converter 2 converts the given signal to a digital mode signal. This digital mode signal is input into the gyro integrator 3. The gyro integrator 3 comprises an integrator 3a and an operator 3b. The output from the A/D converter 2 is input into the integrator 3a and is integrated per the predetermined time to obtain a travel eccentric angle $\theta_R$ (rad). The result is output to the operator 3b. The conversion of the unit of the angle $\theta_R$ is performed by the operator 3b. A travel eccentric angle $\theta_R$ (deg) is thus produced as output. The travel eccentric angle $\theta_R$ corresponds to a yaw angle and is an angle of deviation from an actually instructed direction to the vehicle 32. As described above, the travel eccentric angle $\theta_R$ is input to the main control apparatus 10 and is given to the comparator 11 through the switch 12. In the comparator 11, a direction instruction value $\theta_S$ from the exterior are compared with the travel eccentric angle $\theta_R$ from the gyro integrator 3. Thus the difference $\theta_S - \theta_R$ is obtained. The values $\theta_S - \theta_R$ is input to the left motor velocity instruction component 13 and to the right motor velocity instruction component 14 as a corrected direction instruction value $\theta_E$. The left motor velocity instruction component 13 and the right motor velocity instruction component 14 generate velocity instruction signals $P_L$ and $P_R$ on the basis of the corrected direction instruction value $\theta_E$. The velocity instruction signals $P_L$ and $P_R$ are transmitted to the motor control apparatus 20. As described above, the control can be executed without being influenced by an integration error in the gyro integrator 3 or an error in the output signal caused by voltage drift, when the value of the travel eccentric angle is small. This can be accomplished by executing control, using only a feedback control based on the rotational displacement of a motor.

It is impossible to cope with the trouble by only a motor feedback control system, when a disturbance such as a slip of a wheel occurs and the travel eccentric angle becomes larger than a predetermined value. This is because rotational displacement becomes too large to be detected as data with the velocity encoders 5a and 5b when a slip of a driving wheel occurs. In such a case, a gyro feedback control system is added to the motor feedback control system. The gyro 1 has detected data of the yaw rate of the vehicle 32 which is not influenced by the slip of a driving wheel. Therefore, it is possible to correct the direction of the vehicle 32 even in a state where the disturbance occurs.

As described above, it is possible to make a proper correction of the direction of a vehicle in compliance with the circumstances by executing the gyro feedback control corresponding to the magnitude of the travel eccentric angle.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. A control system for a self-moving vehicle having a pair of drive shafts coaxially provided under each left and right side of said self-moving vehicle, a pair of driving wheels supported on said driving shafts, each motor connected to said driving shafts, and a gyroscope mounted on said self-moving vehicle for detecting a direction to move and for generating a gyro signal, the control system which comprises:

an encoder connected to each driving wheel for detecting each speed of said wheels and for producing a speed signal;

an A/D converter responsive to said gyro signal for converting an analogue signal into a digital signal and for generating said digital signal;

a gyro integrator responsive to said digital signal for integrating said digital signal and for generating a feedback signal;

a main controller responsive to said feedback signal for calculating a rotational speed of said motor and for generating a command signal;

a motor controller responsive to said speed signal and said command signal for integrating both said signals per a predetermined time and for correcting said command signal; and said main controller derives a correction signal of said command signal by integrating a yaw rate per said predetermined time when said yaw rate is higher than a predetermined value so as to obtain self-moving vehicle without receiving an error from said gyro.

2. A control system for a self-moving vehicle having a pair of drive shafts coaxially provided under each left and right side of said self-moving vehicle, a pair of driving wheels supported on said driving shafts, each motor connected to said driving shafts, and a gyroscope mounted on said self-moving vehicle for detecting a direction to move and for generating a gyro signal, the control system which comprises:

an encoder connected to each driving wheel for detecting each speed of said wheels and for producing a speed signal;

an A/D converter responsive to said gyro signal for converting an analogue signal into a digital signal and for generating said digital signal;

a gyro integrator responsive to said digital signal for integrating said digital signal and for generating a feedback signal;

a main controller responsive to said feedback signal for calculating a rotational speed of said motor and for generating a command signal;

a motor controller responsive to said speed signal and said command signal for integrating both said signals per a predetermined time and for correcting said command signal; and said main controller derives a correction signal of said command signal by integrating a yaw rate per said predetermined time when an integrated yaw rate per said predetermined time is higher than a predetermined value so as to obtain self-moving vehicle without receiving an error from said gyro.

* * * * *